(12) United States Patent
Sakazaki et al.

(10) Patent No.: US 7,478,652 B2
(45) Date of Patent: Jan. 20, 2009

(54) FUEL HOSE

(75) Inventors: Kazushige Sakazaki, Komaki (JP); Koji Hioki, Ichinomiya (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 11/689,561

(22) Filed: Mar. 22, 2007

(65) Prior Publication Data

US 2007/0221282 A1 Sep. 27, 2007

(30) Foreign Application Priority Data

Mar. 24, 2006 (JP) ............................. 2006-083749
Feb. 27, 2007 (JP) ............................. 2007-047890

(51) Int. Cl.
*F16L 11/00* (2006.01)

(52) U.S. Cl. ...................... 138/121; 138/137

(58) Field of Classification Search .............. 138/121, 138/122, 137
See application file for complete search history.

(56) References Cited

U.S. PATENT DOCUMENTS

| 3,313,319 | A | * | 4/1967 | Osborn et al. ............... 138/121 |
| 3,731,711 | A | * | 5/1973 | Bauer ........................... 138/178 |
| 4,465,404 | A | * | 8/1984 | Heintzmann et al. ........ 405/288 |
| 4,953,632 | A | * | 9/1990 | Sakaya et al. ........... 165/104.26 |
| 5,413,147 | A | * | 5/1995 | Moreiras et al. ............ 138/109 |
| 5,560,398 | A | * | 10/1996 | Pfleger ........................ 138/121 |
| 6,310,284 | B1 | * | 10/2001 | Ikeda .......................... 174/353 |
| 6,321,794 | B1 | * | 11/2001 | Ishida et al. ................. 138/121 |
| 6,682,796 | B2 | * | 1/2004 | Ito et al. ................... 428/36.91 |
| 2001/0027820 | A1 | * | 10/2001 | Ando et al. .................. 138/137 |
| 2004/0256018 | A1 | * | 12/2004 | Ikemoto et al. ............. 138/126 |
| 2006/0191585 | A1 | * | 8/2006 | Mori ........................... 138/121 |
| 2006/0213567 | A1 | * | 9/2006 | Parpart et al. ............... 138/121 |
| 2006/0225803 | A1 | * | 10/2006 | Chenoweth et al. ......... 138/121 |

FOREIGN PATENT DOCUMENTS

| JP | 8-233179 | 10/1996 |
| JP | 09-253557 | 9/1997 |
| JP | 3605930 | 10/2004 |

* cited by examiner

*Primary Examiner*—James F Hook
(74) *Attorney, Agent, or Firm*—Andrus, Sceales, Starke & Sawall, LLP

(57) ABSTRACT

A fuel hose has multilayered construction and a flexible corrugated portion with corrugation bottom portions and corrugation peak portions. The fuel hose includes a rubber layer and a resin layer that is a laminated on an inner side of the rubber layer. The resin layer has fuel permeation resistance and serves as a barrier layer. The corrugated portion satisfies a condition of $H/W \geq 1.1$ when H represents a height of the corrugation measured between an inside of the corrugation bottom portion and an inside of the corrugation peak portion thereof, and 2W represents an axial distance between an inside of the corrugation bottom portion and an inside of an adjacent corrugation bottom portion.

4 Claims, 4 Drawing Sheets

FUEL HOSE

FIELD OF THE INVENTION

The present invention relates to a fuel hose for transporting a fuel from a fuel inlet to a fuel tank in a motor vehicle, specifically, to a fuel hose of multilayered construction including a rubber layer and a resin layer of fuel permeation resistance that is laminated on an inner side of the rubber layer as a barrier layer.

DESCRIPTION OF THE RELATED ART

For application for a fuel hose (fuel filler hose) transporting a fuel injected in a fuel inlet to a fuel tank in a motor vehicle, conventionally, a typical rubber hose made of a blend of acrylonitrile-butadiene rubber and polyvinyl chloride (NBR/PVC blend) or the like have been used. Such rubber hose has a high vibration-absorbability, easiness of assembly, and fuel permeation resistance.

The fuel hose is usually provided with a corrugated portion for flexibility, for example, in view of vibration absorbing property between a fuel tank and a vehicle body, easiness of assembly, and further, securing elongation or expansion for shock-absorption in the event of motor vehicle collision.

However, regarding the fuel hose, regulations against fuel permeation of motor vehicles have been recently tightened in view of global environment protection, and fuel permeation resistance is anticipated to be increasingly demanded also in the future.

As a countermeasure against that, developed and used is a fuel hose including a rubber layer and a resin layer that is laminated on an inner side (inner surface) of the rubber layer, has an excellent fuel permeation resistance and serves as a barrier layer (for example, Patent Document 1 below).

Here, conventionally, a resin layer is formed on an inner surface of the rubber layer preferably by electrostatic coating.

A technique for formation of the resin layer by electrostatic coating is disclosed, for example, in Patent Document 2 below.

This electrostatic coating is applied in such manner that an injection nozzle or spray nozzle is inserted inside the rubber layer, and resin powder is sprayed from the injection nozzle onto the inner surface of the rubber layer.

In the electrostatic coating, a resin membrane is formed in such manner that negatively or positively charged resin powder (typically, negatively charged resin powder) is sprayed from the injection nozzle, and the resin powder flies to and is attached to the inner surface of the rubber layer as counter electrode (positive electrode) by electrostatic field.

And then, the attached resin powder, namely the resin membrane is melted by heating and then cooled, thereby the resin layer is laminated and formed on the inner surface of the rubber layer.

By the way, the resin layer provided as a barrier layer on an inner side of the rubber layer is harder than the rubber layer. So, when such resin layer is laminated and formed on the inner side of the rubber layer, a hose becomes hard entirely, and it cannot avoided that flexibility and pliableness of the hose is lowered.

Namely, formation of the resin layer lowers flexibility and elongation characteristics (elongatability or stretchability) of the hose, and improvement of the flexibility and the elongation characteristics has been demanded.

[Patent Document 1]  JP-A, 8-233179
[Patent Document 2]  JP-B, 3605930

Under the foregoing circumstances, it is an object of the present invention to provide a fuel hose having a good flexibility and elongatability in spite of including a resin layer laminated on an inner side of a rubber layer.

SUMMARY OF THE INVENTION

According to the present invention, there is provided a novel fuel hose for transporting a fuel from a fuel inlet to a fuel tank. The fuel hose has a multilayered construction including a rubber layer and a resin layer that is laminated on an inner side of the rubber layer, and a flexible corrugated portion with corrugation bottom portions and corrugation peak portions. The resin layer has a fuel permeation resistance and serves as a barrier layer. The corrugated portion provides the fuel hose with flexibility. The corrugated portion is designed so as to satisfy a condition of $H/W \geq 1.1$ when H represents a height of a corrugation, namely a corrugation height measured between an inside or an inner surface of the corrugation bottom portion or a lowest point thereof and an inside or an inner surface of the corrugation peak portion or a highest point thereof, and 2W represents an axial distance or an axial length between an inside of the corrugation bottom portion and an inside of an adjacent corrugation bottom portion or an axial distance or an axial length of an inside opening of the corrugation or a part from the corrugation bottom portion to an adjacent corrugated bottom portion through the corrugation peak portion in the corrugated portion.

According to one aspect of the present invention, the corrugation peak portion and/or the corrugation bottom portion has a flat portion extending straight in an axial direction.

As stated above, according to the present invention, in the fuel hose including the resin layer that is laminated on the inner side of the rubber layer as the barrier layer, the corrugated portion is designed in a manner such that the corrugated portion or each corrugation satisfies the condition of $H/W \geq 1.1$ when H represents the height of the corrugation measured between the inside or the inner surface of the corrugation bottom portion or the lowest point thereof and the inside or the inner surface of the corrugation peak portion or a highest point thereof, and 2W represents the axial distance or the axial length between the inside of the corrugation bottom portion and the inside of the adjacent corrugation bottom portion or the axial distance or the axial length of the inside opening of the corrugation or a part from the corrugation bottom portion to the adjacent corrugation bottom portion through the corrugation peak portion in the corrugated portion. It is confirmed that according to the present invention as above, flexibility of the corrugated portion can be effectively enhanced, and good elongatability of the fuel hose can be achieved.

Among corrugated portions of the same value of H/W, the higher an angle of a slanted portion (slant portion) of each corrugation or in a corrugated portion extending from a corrugation bottom portion to a corrugation peak portion thereof is, the more flexible the corrugated portion is.

Here, when the corrugated portion or each corrugation of the corrugated portion includes a flat portion extending straight in an axial direction of a fuel hose on a corrugation peak portion and/or a corrugation bottom portion thereof, namely the corrugated portion or each corrugation includes an axially-straight-walled portion on the corrugation peak portion and/or the corrugation bottom portion thereof, the angle of the slanted portion can be effectively steepened, whereby flexibility of the corrugated portion can be effectively or further effectively enhanced, and good or better elongatability of the fuel hose can be achieved.

In this case, an axial length of the flat portion is preferably equal to or longer than W/10, more preferably equal to or longer than W/8. However, the axial length of the flat portion preferably equal to or shorter than W/3, more preferably equal to or shorter than W/4. If the axial length of the flat portion is too long with respect to W, flexibility is lowered, flexing resistance is increased, and easiness of assembly is lowered.

By the way, the greater a corrugation height H of a corrugated portion is, the more flexible the corrugated portion is.

On the other hand, in a corrugated portion in which only the corrugation height H is increased, it is difficult to attach resin power on a rear side or inside of a corrugation peak portion by inserting a spray nozzle inside the rubber layer to electrostatically spray or coat the resin power onto an inner surface of the rubber layer for formation of a resin layer thereon. Namely, it is difficult to perform an electrostatic coating successfully.

So, each corrugation or the corrugated portion preferably has a relationship of $2W/H \geq 1$. 2W represents an axial distance or an axial length between the inside of the corrugation bottom portion and the inside of the adjacent corrugation bottom portion, namely an axial distance (a width) of an inside opening of each corrugation or the corrugated portion that is an entrance for resin powder to fly onto an inner surface of the rubber layer (the corrugated portion) during electrostatic coating process or an axial distance (a width) of an inside opening of a part from the corrugation bottom portion to the adjacent corrugation bottom portion through the corrugation peak portion.

In this configuration, easiness of the electrostatic coating can be enhanced when the inner surface of the rubber layer is electrostatically coated with resin powder. Namely, the resin layer can be successfully or favorably formed on the inner surface of the rubber layer by electrostatic coating.

For example, 2W represents an axial distance between an inside point of one corrugation bottom portion of a pair of adjacent corrugation bottom portions and an inside point of the other corrugation bottom portion thereof, the inside point of the one corrugation bottom portion is defined by an intersecting point of a tangent T in an axial direction to an inner surface of the one corrugation bottom portion (or an inner surface of a lowest point of the one corrugation bottom portion) and an extension line K extended from a slanted portion (or an inner surface of a slanted portion) from the corrugation peak portion to the one corrugation bottom portion, and the inside point of the other corrugation bottom portion is defined by an intersecting point of a tangent T in an axial direction to an inner surface of the other corrugation bottom portion (or an inner surface of a lowest point of the other corrugation bottom portion) and an extension line K extended from a slanted portion (an inner surface of a slanted portion) from the corrugation peak portion to the other corrugation bottom portion.

Now, the preferred embodiments of the present invention will be described in detail with reference to the drawings.

DETAILED DESCRIPTIONS OF PREFERRED EMBODIMENTS

Figure 1:
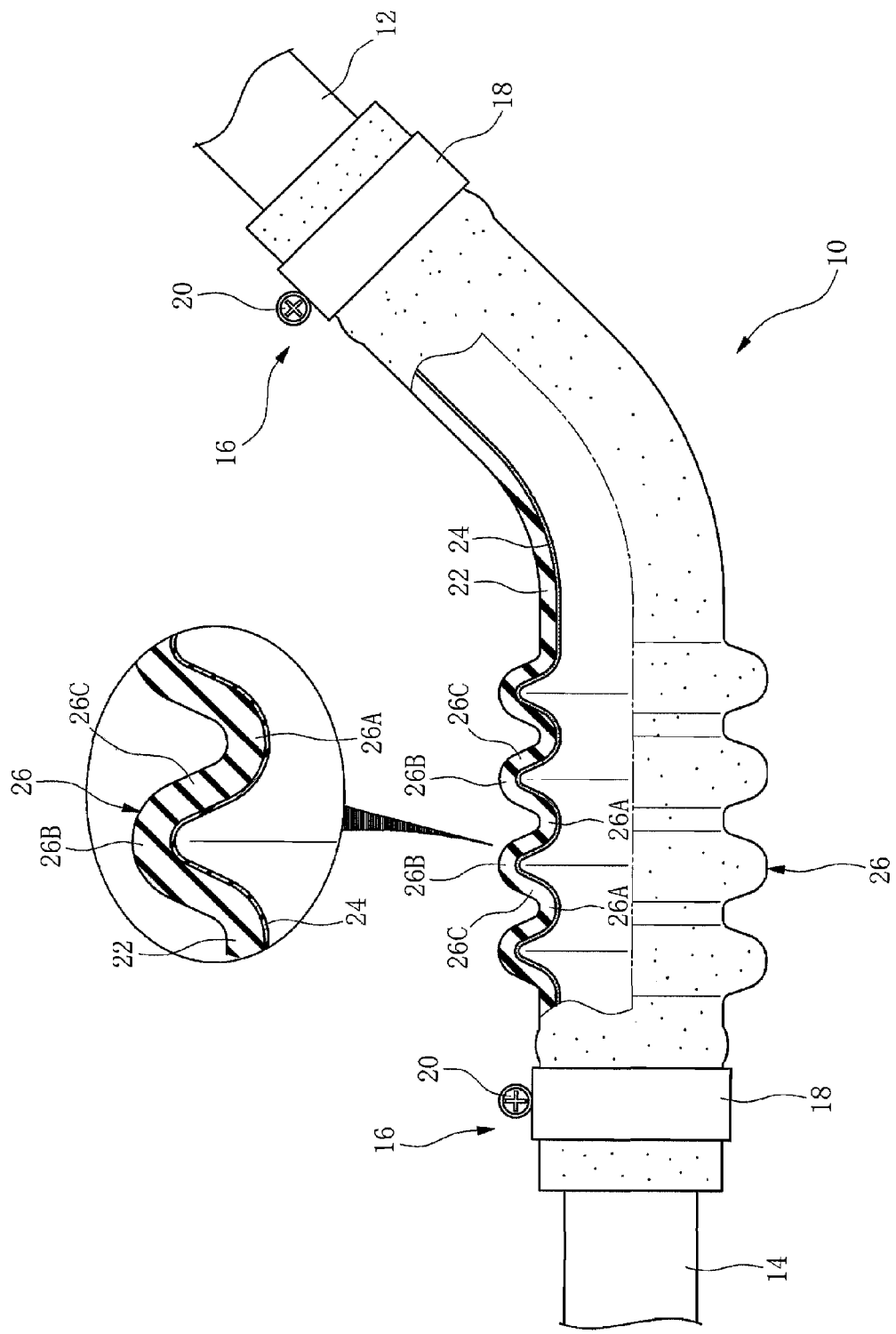
FIG. 1 is a view of a fuel hose according to one embodiment of the present invention.

In FIG. 1, numeral reference 10 indicates a fuel hose or fuel transporting hose (filler hose, hereinafter simply referred to as a hose) for transporting a fuel injected in a fuel inlet to a fuel tank in a motor vehicle, and in the Figure, the hose is connected to the mating pipes 12, 14 at each end thereof.

As shown in the Figure, axial end portions of the hose 10 are fitted on the mating pipes 12, 14, and fixed to the mating pipes 12, 14 by hose clamps 16 in this state, respectively.

The hose clamp 16 has a tightening band 18 and a tightening mechanism constructed by a screw 20.

As the screw 20 is tightened, the tightening band 18 is contracted to tighten an outer peripheral surface of each end portion of the hose 10 in a diametrically contracting direction, and fixes and clamps each end portion thereof on the mating pipe 12 and 14 in connected relation.

The hose 10 has an outer rubber layer 22, and a resin layer 24 that is laminated on an inner surface of the outer rubber layer 22. The resin layer 24 has a fuel permeation resistance and serves as a barrier layer. Here, the resin layer 24 comprises an innermost layer of the hose 10.

Here, the outer rubber layer 22 has a wall thickness, for example, of 2.5 to 4.5 mm, and the resin layer 24 has a wall thickness, for example, of about 0.05 to 0.5 mm.

And, for the outer rubber layer 22, terpolymer of epichlorohydrin-ethylene oxide allyl glycidyl ether (GECO) is used, while for the resin layer 24 polyvinylidene fluoride (PVDF) is used.

The hose 10 has two-layered construction including the outer rubber layer 22 and the resin layer 24, and the resin layer 24 comprises the innermost layer of the hose 10. However, as the case may be, the hose 10 may have multilayered construction including three or more layers by forming another rubber layer or layers on an inner side of the resin layer 24.

And, a corrugated portion 26 is included also in the hose 10 for providing the hose 10 with flexibility.

Figure 2A:
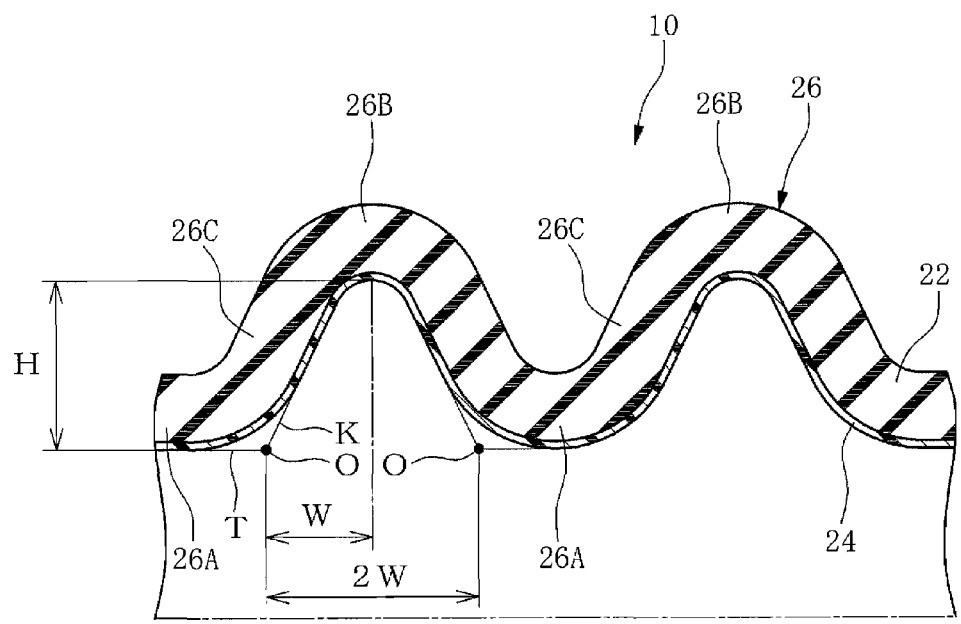
FIG. 2A is an enlarged view of a part of a corrugated portion of the fuel hose of FIG. 1.

In the embodiment of FIG. 2A, the corrugated portion 26 is designed so as to satisfy a condition of $H/W \geq 1.1$ when H represents a height of a corrugation measured between an inside or an inner surface of a corrugation bottom portion 26A of the corrugated portion 26 and an inside or an inner surface of a corrugation peak portion 26B thereof, and 2W represents an axial distance or length between insides of adjacent corrugation bottom portions 26A, 26A. For example, H represents a height of the corrugation measured between an inside or an inner surface of a lowest point of the corrugation bottom portion 26A and an inside or an inner surface of a highest point of the corrugation peak portion 26B.

Meanwhile, strictly speaking, a value of 2W is defined as a distance between a point O (an inside point of one corrugation bottom portion 26A of a pair of adjacent corrugation bottom portions 26A, 26A) and the other point O (an inside point of the other corrugation bottom portion 26A thereof) in FIG. 2A.

Here, the point O is defined as an intersecting point of a tangent T to an inner surface of the corrugation bottom portion 26A in an axial direction of the hose 10, and an extension line K extended from an inner surface of a slant portion 26C of the corrugated portion 26.

Figure 2B:
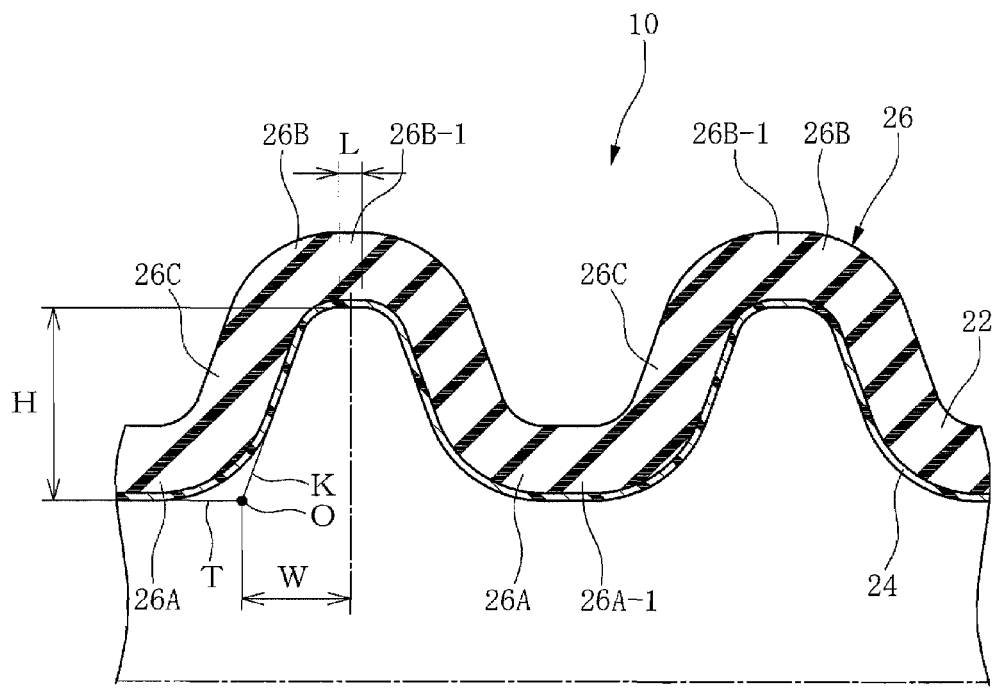
FIG. 2B is a view of a modified embodiment of the corrugated portion of the fuel hose of FIG. 1.

FIG. 2B shows another corrugated portion of the hose 10 where the condition of H/W≧1.1 is satisfied and the corrugation peak portion 26B includes a straight-walled portion or flat portion 26B-1 extending straight in an axial direction of the hose 10 (in this embodiment, the bottom portion 26A also includes the straight-walled portion or the flat portion 26A-1).

Here, an axial length L of the flat portion 26B-1 is equal to or longer than W/10, more preferably, equal to or longer than W/8.

In the embodiment of FIG. 2B, a relationship between 2W and H is maintained corresponding to that of the embodiment of FIG. 2A. However, since the corrugation peak portion 26B includes the flat portion 26B-1, an angle of the slant portion 26C in FIG. 2B is steepened compared to that of the embodiment of FIG. 2A, namely the slant portion 26C in FIG. 2B has a shape rising upward compared to the embodiment shown in FIG. 2A.

As such, when the angle of the slant portion 26C is more steepened, flexibility and pliableness of the corrugated portion 26 is more increased.

Figure 3A:
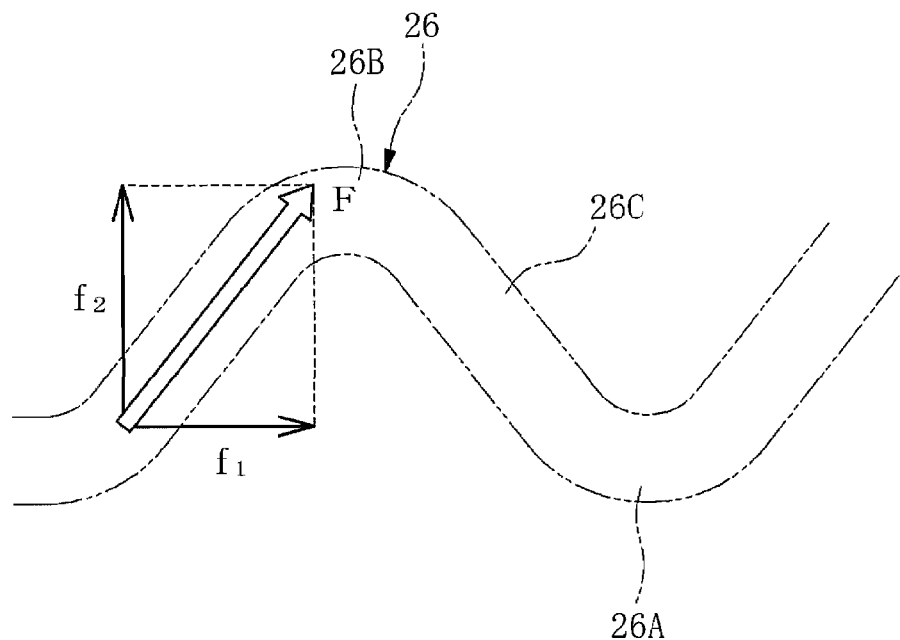
FIG. 3A is a schematic view showing flexibility and pliableness of the fuel hose of FIG. 2A when a load F is exerted to the corrugated portion thereof.
Figure 3B:
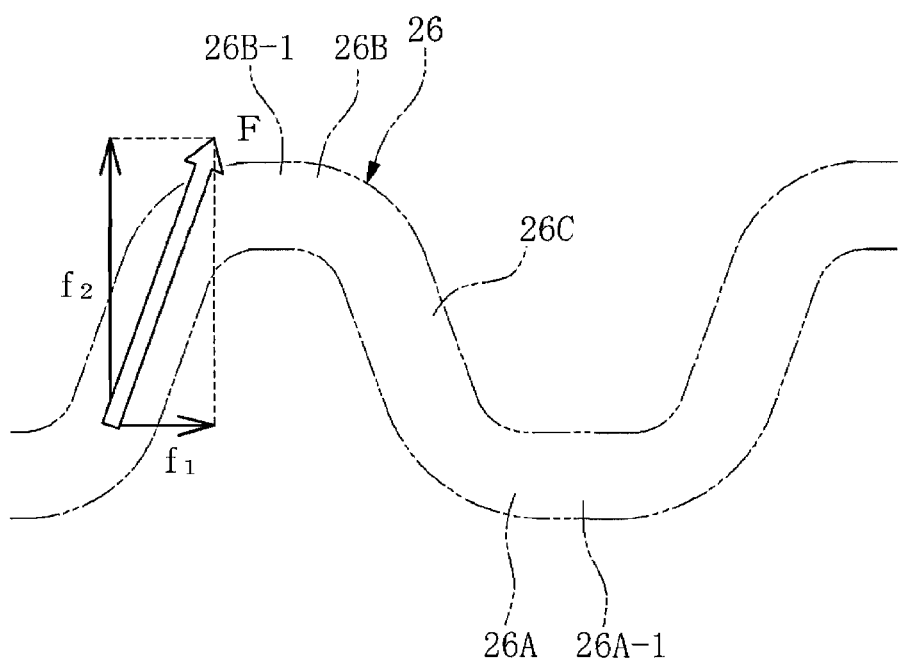
FIG. 3B is a schematic view showing flexibility and pliableness of the fuel hose of FIG. 2B when a load F is exerted to the corrugated portion thereof.

That is schematically shown in FIG. 3. As shown in FIGS. 3A, 3B for comparison, when a load F is exerted on each of the corrugated portions 26, equally, a load component $f_1$ to an axial direction in a corrugation of FIG. 3B in which the slant portion 26C is steepened is smaller than that in a corrugation of FIG. 3A.

That means, in FIG. 2B small load is sufficient for deforming the corrugated portion 26 in an axial direction of the hose 10. Namely, the corrugated portion 26 can be flexibly deformed under a small force in the axial direction of the hose 10 in FIG. 21B. The corrugated portion 26 of FIG. 2B has higher flexibility and pliableness than the corrugated portion 26 of FIG. 2A.

EXAMPLE

Figure 4:
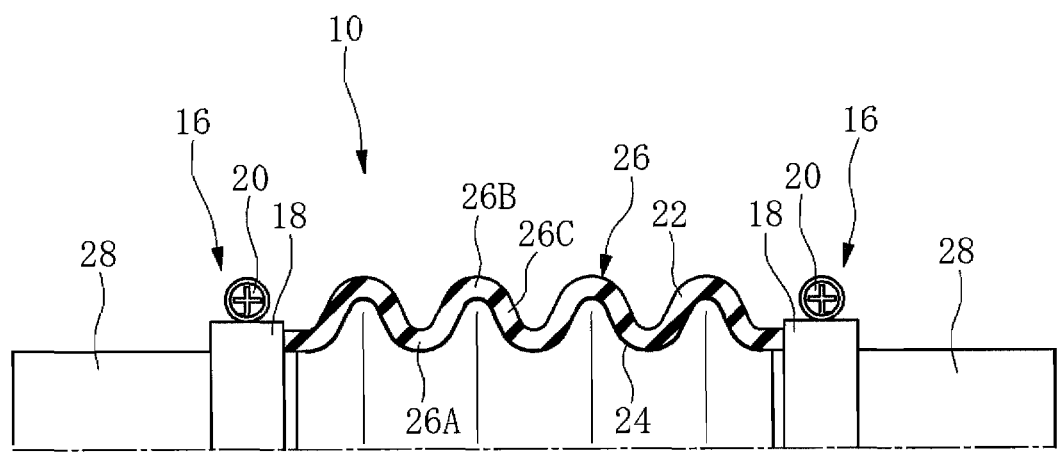
FIG. 4 is a view showing a method for measuring elongation and load by exerting an axial pull-force on a corrugated portion of a fuel hose.

In order to evaluate flexibility or pliableness, elongation of a corrugated portion with respect to a load is evaluated. The corrugated portion is fixed to rod-shaped jigs 28 at each end thereof by a hose clamp 16 as shown in FIG. 4, the corrugated portion is pulled by exerting a pull force in an axial direction thereon at a constant pull velocity of 50 mm/minute, and an elongated (displaced) length of the corrugated portion under every load of 100 N is measured to calculate or sought a relationship between a displacement length and a load.

The results are shown in Table 1 and Table 2.

Table 1 shows measured values of the example according to FIG. 2A, namely a corrugated portion 26 that does not include flat portions 26B-1 on corrugation peak portions 26B. And, Table 2 shows measured values of another example according to FIG. 2B, namely a corrugated portion 26 that includes the flat portions 26B-1 on the corrugation peak portions 26B.

Table 1 and Table 2 also show measured values of comparison examples corresponding to these examples, respectively.

TABLE 1

| | | Example No. 1 No flat portions on corrugation peak portions H/W = 1.1 (No. of corrugation = 4) | | | Comparison Example No. 1 No flat portions on corrugation peak portions H/W = 0.9 (No. of corrugation = 3) | | |
|---|---|---|---|---|---|---|---|
| | | PVDF/GECO layered hose | | | | | |
| Item Elongation | Condition Initial stage | Load (N) | Displacement length (mm) | Increase (mm) | Load (N) | Displacement length (mm) | Increase (mm) |
| | | 100 | 5.5 | — | 100 | 2.5 | — |
| | | 200 | 10.8 | 5.3 | 200 | 5.3 | 2.8 |
| | | 300 | 16.1 | 5.3 | 300 | 7.8 | 2.5 |
| | | 400 | 21.6 | 5.5 | 400 | 9.9 | 2.1 |
| | | 500 | 26.8 | 5.2 | 500 | 12.1 | 2.2 |
| | | *6.7 | | | *4.0 | | |

Note:
*Elongation per corrugation

TABLE 2

| | | Comparison Example No. 2 No flat portions on corrugation peak portions H/W = 1.0 (No. of corrugation = 3) | | | Example No. 2 Flat portions on corrugation peak portions H/W = 1.1 (No. of corrugation = 4) | | |
|---|---|---|---|---|---|---|---|
| | | PVDF/GECO layered hose | | | | | |
| Item Elongation | Condition Initial stage | Load (N) | Displacement length (mm) | Increase (mm) | Load (N) | Displacement length (mm) | Increase (mm) |
| | | 100 | 3.1 | — | 100 | 6.6 | — |
| | | 200 | 6.4 | 3.3 | 200 | 12.8 | 6.2 |
| | | 300 | 9.5 | 3.1 | 300 | 19.2 | 6.4 |
| | | 400 | 12.6 | 3.1 | 400 | 25.8 | 6.6 |

TABLE 2-continued

| | | Comparison Example No. 2<br>No flat portions on corrugation<br>peak portions<br>H/W = 1.0 (No. of corrugation = 3) | | | Example No. 2<br>Flat portions on corrugation peak<br>portions<br>H/W = 1.1 (No. of corrugation = 4) | | |
|---|---|---|---|---|---|---|---|
| | | PVDF/GECO layered hose | | | | | |
| Item<br>Elongation | Condition<br>Initial<br>stage | Load<br>(N) | Displacement<br>length<br>(mm) | Increase<br>(mm) | Load<br>(N) | Displacement<br>length<br>(mm) | Increase<br>(mm) |
| | | 500<br>*5.2 | 15.6 | 3.0 | 500<br>*8.1 | 32.5 | 6.7 |

Note:
*Elongation per corrugation

In Table 1 and Table 2, "elongation per corrugation" means elongation (elongated length) per corrugation when a load of 500 N is exerted on the corrugated portion equally. The greater the value of elongation per corrugation is, the more flexible the corrugated portion is. For example, in the Example 1, displacement length under the load 500 N is 26.8 mm (four corrugations), therefore displacement length per one corrugation is 6.7 mm.

With reference to the results of Table 1, in Comparison Example No. 1 (H/W=0.9), elongation per corrugation is 4.0, lower than a target value of 6.5, while in Example No. 1 (H/W=1.1), elongation per corrugation is 6.7, higher than the target value of 6.5.

With reference to the results of Table 2, in Comparison Example No. 2 where a corrugated portion satisfies H/W=1.0 and includes no flat portion on its corrugation peak portion, elongation per corrugation is 5.2, lower than the target value of 6.5, while in Example No. 2 where a corrugated portion satisfies H/W=1.1 and includes the flat portion 26B-1 on its corrugation peak portion, elongation per corrugation is 8.1, higher than more preferable target value of 8. Elongation per corrugation of Example No. 2 is larger than 1.5 times of elongation per corrugation of Comparison Example No. 2, and reaches 1.56 times thereof.

The value in a column "Increase" indicates increase in elongated length (displacement length) of a corrugated portion for every additional load of 100 N.

In the hose 10 according to the embodiment as stated above, flexibility of the corrugated portion 26 is effectively enhanced, and good elongation characteristics of the hose 10 can be also achieved.

And, when the corrugated portion 26 includes the flat portions 26B-1 that are straight in an axial direction on the corrugation peak portions 26B, a slant angle of each slant portion 26C is steepened, thereby the flexibility can be further effectively enhanced, and more preferable elongation characteristics of the hose 10 can be achieved.

While the present invention has been described in terms of preferred embodiments, it is to be understood that these are presented only for the purpose of illustration. The present invention can be embodied by a variety of modifications without departing from the scope of the invention.

What is claimed is:

1. A fuel hose having a multilayered construction and a flexible corrugated portion with corrugation bottom portions and corrugation peak portions for transporting a fuel from a fuel inlet to a fuel tank, the fuel hose, comprising:
   a rubber layer, and
   a resin layer comprising a laminate with and on an inner side of the rubber layer, the resin laying having fuel permeation resistance and serving as a barrier layer;
   wherein on the corrugated portion, the resin layer is laminated integrally on the inner side of the rubber layer without creating clearance therebetween and the resin layer and the rubber layer integrally form the corrugation bottom portions and the corrugation peak portions alternately,
   wherein one of the plurality of all of the corrugation peak portions and the plurality of all of the corrugation bottom portions has a flat portion extending straight in an axial direction,
   wherein the corrugated portion has slanted portions, each of the slanted portions extends straight at a slant angle between the corrugation peak portion and the corrugation bottom portion, and smoothly curved connection is provided between the flat portion and the slanted portion,
   wherein the corrugated portion satisfies a condition of $H/W \geq 1.1$ when H represents a height of a corrugation measured between an inside of the corrugation bottom portion and an inside of the corrugation peak portion, and 2W represents an axial distance between an inside of the corrugation bottom portion and an inside of an adjacent corrugation bottom portion.

2. The fuel hose as set forth in claim 1, wherein said H represents a height of the corrugation measured between an inside of a lowest point of the corrugation bottom portion and an inside of a highest point of the corrugation peak portion.

3. The fuel hose as set forth in claim 1, wherein said 2W represents an axial distance of an inside opening of a part from the corrugation bottom portion to an adjacent corrugation bottom portion through the corrugation peak portion in the corrugated portion.

4. The fuel hose as set forth in claim 1, wherein said 2W represents an axial distance between an inside point of one corrugation bottom portion of a pair of adjacent corrugation bottom portions and an inside point of the other corrugation bottom portion thereof, the inside point of the one corrugation bottom portion is defined by an intersecting point of a tangent T in an axial direction to an inner surface of the one corrugation bottom portion and an extension line K extended from a slanted portion from the corrugation peak portion to the one corrugation bottom portion, and the inside point of the other corrugation bottom portion is defined by an intersecting point of a tangent T in an axial direction to an inner surface of the other corrugation bottom portion and an extension line K extended from a slanted portion from the corrugation peak portion to the other corrugation bottom portion.

* * * * *